United States Patent
Ogata et al.

(10) Patent No.: US 7,669,701 B2
(45) Date of Patent: Mar. 2, 2010

(54) HYDRAULIC PRESSURE CONTROL APPARATUS FOR A VEHICULAR POWER TRANSMITTING DEVICE

(75) Inventors: Yusuke Ogata, Toyota (JP); Ryuji Chida, Toyota (JP); Yoshinobu Soga, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 155 days.

(21) Appl. No.: 11/882,226

(22) Filed: Jul. 31, 2007

(65) Prior Publication Data
US 2008/0051251 A1    Feb. 28, 2008

(30) Foreign Application Priority Data
Aug. 28, 2006    (JP) ............................. 2006-231020

(51) Int. Cl.
*F16H 61/14* (2006.01)
(52) U.S. Cl. .................................... 192/3.29
(58) Field of Classification Search .................... None
See application file for complete search history.

(56) References Cited

U.S. PATENT DOCUMENTS

| | | | | |
|---|---|---|---|---|
| 5,007,309 A | * | 4/1991 | Lemon et al. | 477/131 |
| 5,033,331 A | * | 7/1991 | Takada et al. | 477/150 |
| 5,163,540 A | * | 11/1992 | Mainquist et al. | 192/3.3 |
| 5,305,862 A | * | 4/1994 | Gierer | 192/3.3 |
| 6,419,059 B1 | * | 7/2002 | Nobu et al. | 192/3.3 |
| 6,835,147 B2 | * | 12/2004 | Iwata et al. | 474/28 |

FOREIGN PATENT DOCUMENTS

| | | |
|---|---|---|
| JP | A 02-261966 | 10/1990 |
| JP | A 06-147311 | 5/1994 |
| JP | A 06-241310 | 8/1994 |
| JP | A 10-132070 | 5/1998 |
| JP | A-2003-120797 | 4/2003 |

* cited by examiner

*Primary Examiner*—Richard M. Lorence
(74) *Attorney, Agent, or Firm*—Oliff & Berridge, PLC

(57) ABSTRACT

A first orifice is provided in a first fluid passage upstream of a cooler, and a second orifice is provided in a second fluid passage. The flowrates of hydraulic fluid flowing through the first and second fluid passages are regulated by the first and second orifices, respectively, and are thus suppressed from becoming excessive. Also, the downstream side of the second fluid passage is connected to the first fluid passage between the first orifice and the cooler, and a lubrication passage is connected to the first fluid passage downstream of the cooler. Accordingly, the lubrication passage is a single passage and the cooler and the lubrication passage are arranged in series so the cooler flowrate and the lubrication flowrate are the same. As a result, the flowrate of hydraulic fluid that flows out from a secondary regulator valve to the upstream side of an oil pump can be increased.

2 Claims, 4 Drawing Sheets

$$Q_{LUB} = C \cdot S_A \sqrt{\frac{2(P_{L2} - P1)}{\rho}} \quad \cdots (5)$$

$$Q_{LUB} = C \cdot S_B \sqrt{\frac{2P1}{\rho}} \quad \cdots (6)$$

HYDRAULIC PRESSURE CONTROL APPARATUS FOR A VEHICULAR POWER TRANSMITTING DEVICE

INCORPORATION BY REFERENCE

The disclosure of Japanese Patent Application No. 2006-231020 filed on Aug. 28, 2006, including the specification, drawings and abstract is incorporated herein by reference in its entirety.

BACKGROUND OF THE INVENTION

1. Field of the Invention

The invention relates to a hydraulic pressure control apparatus for a vehicular power transmitting device provided with a fluid power transmitting device with a lockup clutch through which hydraulic fluid discharged from an oil pump is circulated after being pressure regulated by a relief type pressure regulator valve. More particularly, the invention relates to technology that increases the flowrate when some excess hydraulic fluid that flows out from the pressure regulator valve flows out to the upstream side of the oil pump.

2. Description of the Related Art

A hydraulic pressure control apparatus for a power transmitting device of a vehicle which is provided with a fluid power transmitting device with a lockup clutch through which hydraulic fluid discharged from an oil pump is circulated after being pressure regulated by a relief type pressure regulator valve is well known. This hydraulic pressure control apparatus switches the circulation path of hydraulic fluid depending on whether the lockup clutch is applied or released such that when the lockup clutch is released, hydraulic fluid flows out from the fluid power transmitting device to a first fluid passage that is connected to a cooler on the downstream side. Meanwhile, some excess hydraulic fluid that flows out from a pressure regulator valve flows out to a second fluid passage, while the rest flows out to the upstream side of the oil pump.

Japanese Patent Application Publication No. JP-A-2003-120797, for example, describes one such hydraulic pressure control apparatus for an automatic transmission (i.e., power transmitting device). The hydraulic pressure control apparatus described in Japanese Patent Application Publication No. JP-A-2003-120797 circulates hydraulic fluid that has been pressure regulated by a secondary regulator valve through a torque converter with a lockup clutch. When the lockup clutch is released (i.e., off), the hydraulic fluid flows out of the torque converter and into a fluid passage to which a cooler and a safety valve are connected in parallel on the downstream side. Hydraulic fluid that was heated by agitation from the torque converter is cooled in the cooler. Also, in the technology described in Japanese Patent Application Publication No. JP-A-2003-120797, some of the excess hydraulic fluid that flows out from the secondary regulator valve flows out a fluid passage for lubrication, while the rest flows to the upstream side of the oil pump.

However, in the hydraulic pressure control circuit such as that described in Japanese Patent Application Publication No. JP-A-2003-120797, of the amount of hydraulic fluid supplied to the secondary regulator valve, the amount of hydraulic fluid that needs to be cooled (i.e., the amount that needs to flow through the cooler) has to flow to the cooler. Further, the amount of hydraulic fluid needed for lubrication has to flow to a lubrication passage which is in a different system (i.e., along a different path) than the cooler. Moreover, when there is an excessive amount of fluid circulating through the torque converter while the lockup clutch is released (i.e., off), an excessive amount of hydraulic fluid is discharged from the safety valve, thus increasing waste. As a result, less hydraulic fluid may end up flowing out from the secondary regulator valve to the upstream side of the oil pump, which may be detrimental with respect to cavitation of the oil pump (i.e., cavitation tends to occur more easily), and may make fluid vibration more apt to occur when operating at high temperatures and high speeds, and during extremely low temperature starts, for example, which may lead to abnormal noises and reduced durability.

SUMMARY OF THE INVENTION

This invention thus provides a hydraulic pressure control apparatus for a power transmitting device of a vehicle, which can increase the amount of hydraulic fluid that flows (hereinafter also referred to as the "flowrate") out from a relief type pressure regulator valve to the upstream side of an oil pump.

A first aspect of the invention relates to a hydraulic pressure control apparatus of a vehicular power transmitting device provided with a fluid power transmitting device with a lockup clutch through which hydraulic fluid discharged from an oil pump is circulated after being pressure regulated by a relief type pressure regulator valve. The hydraulic pressure control apparatus switches circulation paths of the hydraulic fluid depending on whether the lockup clutch is applied or released, such that when the lockup clutch is released, hydraulic fluid flowing out from the fluid power transmitting device flows to a first fluid passage that is connected to a cooler on the downstream side, while some excess hydraulic fluid that flows out from the pressure regulator valve flows out to a second fluid passage and the rest flows to the upstream side of the oil pump. This hydraulic pressure control apparatus includes a first orifice provided in the first fluid passage upstream of the cooler, and a second orifice provided in the second fluid passage. The downstream side of the second fluid passage is connected to the first fluid passage between the first orifice and the cooler, and a lubrication passage is connected to the first fluid passage downstream of the cooler.

According to this aspect, the first orifice is provided in the first fluid passage upstream of the cooler and the second orifice is provided in the second fluid passage. Therefore, the amounts of hydraulic fluid that flow to the first and second fluid passages are regulated by the first and second orifices, respectively, and thus are inhibited from becoming excessive. Also, the downstream side of the second fluid passage is connected to the first fluid passage between the first orifice and the cooler, and the lubrication passage is connected to the first fluid passage downstream of the cooler. Thus, the hydraulic fluid that flows to the second fluid passage also flows to the lubrication passage which is in the same system, and the cooler and the lubrication passage are arranged in series. Accordingly, the flowrate for cooling the hydraulic fluid (i.e., the cooler flowrate) and the flowrate for lubrication (i.e., the lubrication flowrate) are the same. As a result, the flowrate or amount of the hydraulic fluid that flows out from the pressure regulator valve to the upstream side of the oil pump can be increased.

In the hydraulic pressure control apparatus of a vehicular power transmitting device according to the first aspect, a safety valve may be provided in parallel with the cooler on the downstream side of the first fluid passage, and the opening pressure of the safety valve may be set such that the safety valve will not open when the lockup clutch is applied. That is, the opening pressure of the safety valve may be set higher than the pressure of excess hydraulic fluid from the second fluid passage that is applied when the lockup clutch is applied (i.e., engaged). According to this structure, the amount of hydraulic fluid that flows out from the safety valve can be suppressed, thus enabling more hydraulic fluid to flow out from the pressure regulator valve to the upstream side of the oil pump.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a circuit diagram of the main portions of a hydraulic pressure control circuit that are related to line pressure control and apply and release control of a lockup clutch and the like;

DETAILED DESCRIPTION OF THE PREFERRED EMBODIMENTS

In the following description and the accompanying drawings, the present invention will be described in more detail in terms of exemplary embodiments.

Figure 1:
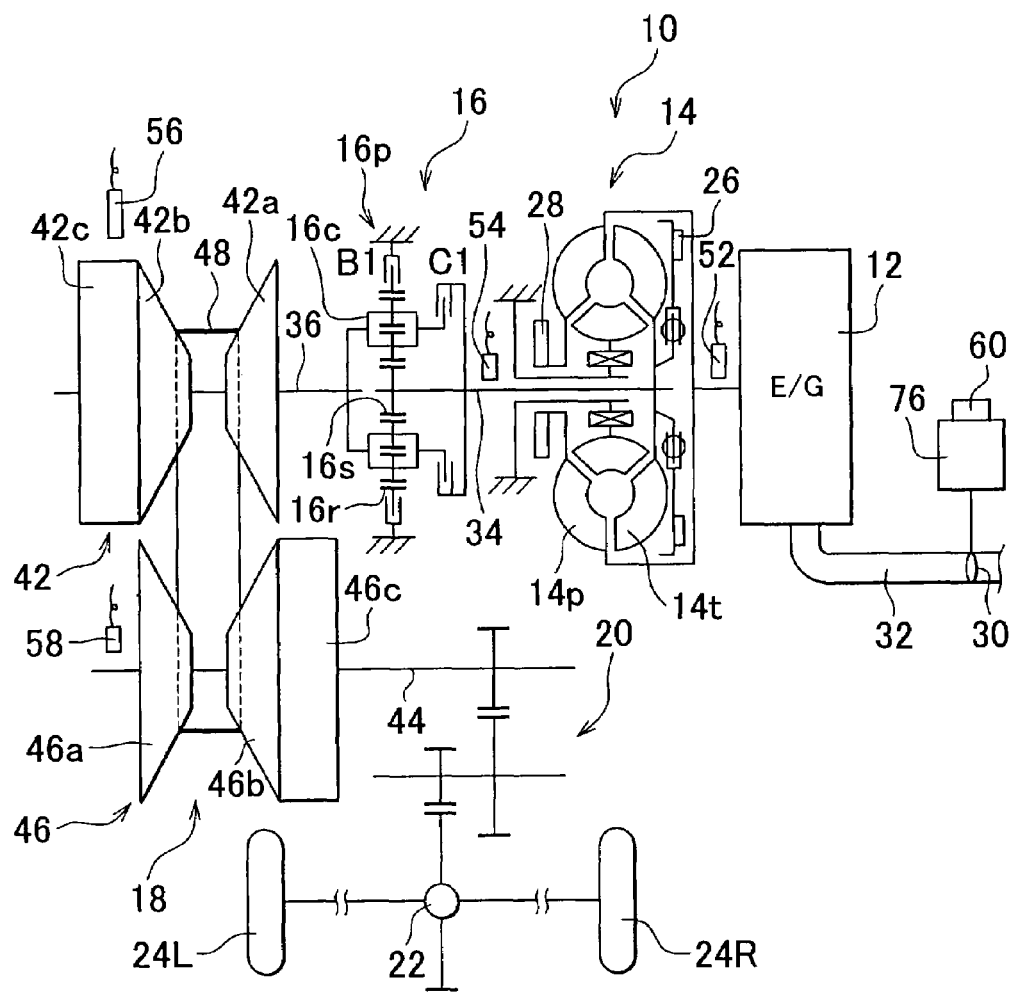
FIG. 1 is a skeleton view of a vehicular drive apparatus to which the invention has been applied.

FIG. 1 is a skeleton view of the structure of a vehicular drive apparatus 10 to which the invention has been applied. This vehicular drive apparatus 10 is a transverse mounted automatic transmission which is preferably used in a FF (front engine, front drive) type vehicle and includes an engine 12 as a power source for running the vehicle. Output of the engine 12, which is an internal combustion engine, is transmitted from a crankshaft of the engine 12 and a torque converter 14, which serves as a fluid power transmitting device, to a differential gear unit 22 via a forward-reverse switching device 16, a belt type continuously variable transmission (CVT) 18, and reduction gears 20, after which it is distributed to left and right driving wheels 24L and 24R.

The torque converter 14 has a pump impeller 14$p$ that is connected to the crankshaft of the engine 12 and a turbine runner 14$t$ that is connected to the forward-reverse switching device 16 via a turbine shaft 34 corresponding to an output side member of the torque converter 14, and transmits power via fluid. Also, a lockup clutch 26 is provided between the pump impeller 14$p$ and the turbine runner 14$t$. This lockup clutch 26 is selectively applied and released by a hydraulic pressure control circuit 100 (see FIGS. 2 and 3). When the lockup clutch 26 is fully applied, the pump impeller 14$p$ and the turbine runner 14$t$ rotate together as a single unit. A mechanical oil pump 28 is connected to the pump impeller 14$p$. This mechanical oil pump 28 is driven by the engine 12 and generates hydraulic pressure used to control the shifting of the CVT 18, apply belt squeezing force, control the apply and release of the lockup clutch 26, and supply lubrication oil to various parts.

The forward-reverse switching device 16 includes a forward clutch C1, a reverse brake B1, and a double pinion type planetary gear set 16$p$ as its main components. The turbine shaft 34 of the torque converter 14 is integrally connected to a sun gear 16$s$ of the planetary gear set 16$p$ and an input shaft 36 of the CVT 18 is integrally connected to a carrier 16$c$ of the planetary gear set 16$p$. The carrier 16$c$ and the sun gear 16$s$ can be selectively connected together via the forward clutch C1, and a ring gear 16$r$ of the planetary gear set 16$p$ can be selectively fixed to a housing via the reverse brake B1. The forward clutch C1 and the reverse brake B1 are both hydraulic type friction apply devices that are frictionally applied by a hydraulic cylinder and correspond to connection/disconnection devices.

Applying the forward clutch C1 and releasing the reverse brake B1 results in the forward-reverse switching device 16 rotating as a single unit such that the turbine shaft 34 is directly connected to the input shaft 36, thus establishing a forward power transmission path in which driving force in the forward direction is transmitted to the CVT 18. On the other hand, applying the reverse brake B1 and releasing the forward clutch C1 establishes a reverse power transmission path in the forward-reverse switching device 16 such that the input shaft 36 rotates in a direction opposite that of the turbine shaft 34, which results in driving force in the reverse direction being transmitted to the CVT 18. Also, releasing both the forward clutch C1 and the reverse brake B1 places the forward-reverse switching device 16 in a neutral state (disconnected state) in which the transmission of power is interrupted.

The CVT 18 includes an input side variable pulley (primary pulley) 42, an output side variable pulley (secondary pulley) 46, and a transmission belt 48. The input side variable pulley 42 is an input side member with a variable effective diameter which is provided on the input shaft 36. The output side variable pulley 46 is an output side member which also has a variable effective diameter and is provided on an output shaft 44. The transmission belt 48 is wound around the variable pulleys 42 and 46 such that power is transmitted via frictional force between the transmission belt 48 and the variable pulleys 42 and 46.

The variable pulley 42 includes a fixed sheave 42$a$, a movable sheave 42$b$, and an input side hydraulic cylinder 42$c$. Similarly, the variable pulley 46 includes a fixed sheave 46$a$, a movable sheave 46$b$, and an output side hydraulic cylinder 46$c$. The fixed sheave 42$a$ is fixed to the input shaft 36 while the fixed sheave 46$a$ is fixed to the output shaft 44. The movable sheave 42$b$ is provided on the input shaft 36 so as to be able to move in the axial direction but not rotate around its axis relative to the input shaft 36. Similarly, the movable sheave 46$b$ is provided on the output shaft 44 so as to be able to move in the axial direction but not rotate around its axis relative to the output shaft 44. The input side hydraulic cylinder 42$c$ acts as a hydraulic actuator which applies thrust that can change the V groove width between the fixed sheave 42$a$ and the movable sheave 42$b$, while the output side hydraulic cylinder 46$c$ acts as a hydraulic actuator which applies thrust that can change the V groove width between the fixed sheave 46$a$ and the movable sheave 46$b$. The speed ratio γ (i.e., speed ratio γ=input shaft rotation speed $N_{IN}$/output shaft rotation speed $N_{OUT}$) is changed in a continuous fashion by changing the V groove widths of both variable pulleys 42 and 46, and thus the winding diameter (effective diameter) of the transmission belt 48 around those pulleys, which is done by controlling the amount of hydraulic fluid supplied to or discharged from the input side hydraulic cylinder 42$c$ by the hydraulic pressure control circuit 100. Also, the belt squeezing force is controlled so that the transmission belt 48 does not slip by controlling the secondary pressure (hereinafter referred to as "belt tension") Pout, which is the hydraulic pressure in the output side hydraulic cylinder 46c, with the hydraulic pressure control circuit 100. As a result of this control, primary pressure (hereinafter referred to as "shift pressure") Pin, which is the hydraulic pressure in the input side hydraulic cylinder 42c, is generated.

Figure 2:
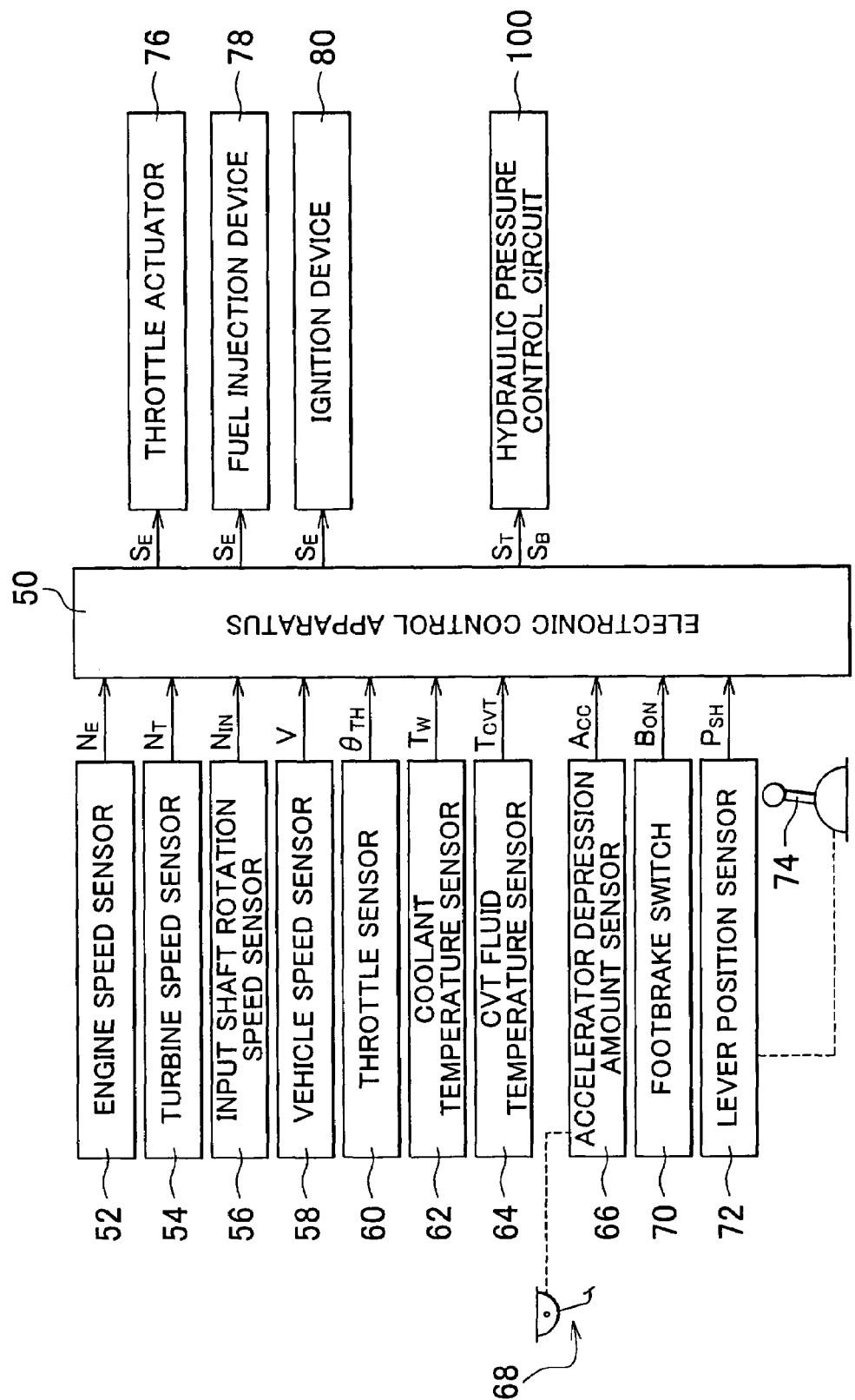
FIG. 2 is a block diagram showing the main portions of a control system provided in the vehicle for controlling the vehicular drive apparatus and the like shown in FIG. 1.

FIG. 2 is a block diagram of the main portions of a control system provided in a vehicle for controlling the vehicular drive apparatus 10 and the like in FIG. 1. An electronic control apparatus 50 includes a so-called microcomputer that includes, for example, a CPU, RAM, ROM, an input/output interface, and the like. The electronic control apparatus 50 executes various controls such as output control of the engine 12, belt squeezing force control and shift control of the CVT 18, and torque capacity control of the lockup clutch 26 by having the CPU process signals according to a program stored in advance in the ROM while using the temporary storage function of the RAM. When necessary, the CPU may be formed divided into a portion for controlling the engine and a portion for controlling the hydraulic pressures of the CVT 18 and the lockup clutch 26.

Various signals are output to the electronic control apparatus 50 from various sensors and switches provided in the vehicle. These signals include a signal indicative of a crankshaft rotation speed corresponding to a crankshaft rotation angle (position) $A_{CR}$ (°) and the speed of the engine 12 (i.e., engine speed) $N_E$ detected by an engine speed sensor 52; a signal indicative of a speed of the turbine shaft 34 (i.e., turbine speed) $N_T$ detected by a turbine speed sensor 54; a signal indicative of a rotation speed of the input shaft 36 (i.e., the input shaft rotation speed) $N_{IN}$, which is the input shaft rotation speed of the CVT 18 detected by an input shaft rotation speed sensor 56; a signal indicative of a rotation speed of the output shaft 44 (i.e., the output shaft rotation speed) $N_{OUT}$, i.e., the vehicle speed V corresponding to the output shaft rotation speed $N_{OUT}$, which is the output rotation speed of the CVT 18 detected by a vehicle speed sensor (output shaft rotation speed sensor) 58; a throttle valve opening amount signal indicative of a throttle valve opening amount $\theta_{TH}$ of an electronic throttle valve 30 provided in an intake pipe 32 (see FIG. 1) of the engine 12, which is detected by a throttle sensor 60; a signal indicative of a coolant temperature $T_W$ of the engine 12 detected by a coolant temperature sensor 62; a signal indicative of a fluid temperature $T_{CVT}$ in the hydraulic pressure circuit of the CVT 18 and the like detected by a CVT fluid temperature sensor 64; an accelerator depression amount indicative of an accelerator depression amount Acc which is the operation amount of an accelerator pedal 68 detected by an accelerator depression amount sensor 66; a brake operation signal indicative of a brake operation $B_{ON}$ of a footbrake that is a service brake, which is detected by a footbrake switch 70; and an operation position signal indicative of a lever position (operating position) $P_{SH}$ of a shift lever 74 detected by a lever position sensor 72.

The electronic control apparatus 50 also outputs engine output control command signals $S_E$ for controlling the output of the engine 12, such as a throttle signal that drives a throttle actuator 76 for controlling the opening and closing of the electronic throttle valve 30, a fuel injection signal for controlling the amount of fuel injected from a fuel injection device 78, and an ignition timing signal for controlling the ignition timing of the engine 12 by an ignition device 80. Further, the electronic control apparatus 50 also outputs various signals to the hydraulic pressure control circuit 100. Some of these signals include shift control command signals $S_T$ for changing the speed ratio γ of the CVT 18, such as command signals for driving a solenoid valve DS1 and a solenoid valve DS2 that control the amount of hydraulic fluid that flows to the input side hydraulic cylinder 42c; a squeezing force control command signal $S_B$ for adjusting the squeezing force applied to the transmission belt 48, such as a command signal for driving a linear solenoid valve SLS that adjusts the belt tension Pout; and lockup control command signals for controlling the application and release of the lockup clutch 26, such as a command signal for driving a solenoid valve DSU that controls operation of a lockup control valve 114 for switching the lockup clutch 26 between an applied state and a released state, and a command signal for driving a linear solenoid valve SLT that controls a line pressure $P_L$.

The shift lever 74 is provided near the driver's seat, for example, and is manually operated into any one of five lever positions, i.e., P, R, N, D, and L, in that order.

The P position (range) is a park position which both renders the vehicular drive apparatus 10 in a neutral state in which the power transmission path in the vehicular drive apparatus 10 is interrupted, and mechanically prevents the output shaft 44 from rotating (i.e., locks the output shaft 44) by a mechanical parking mechanism. The R position is a reverse running position in which the output shaft 44 rotates in reverse. The N position is a neutral position that renders the vehicular drive apparatus 10 in a neutral state in which the power transmission path in the vehicular drive apparatus 10 is interrupted. The D position is a forward running position that establishes an automatic shift mode in a shift range within which the CVT 18 is allowed to shift, and in which automatic shift control is executed. The L position is an engine brake position in which a strong engine brake is applied. In this way, the P and N positions are non-running positions that are selected when the vehicle is not going to be operated (made to run), and the R, D, and L positions are running positions that are selected when the vehicle is going to be operated (made to run).

Figure 3:
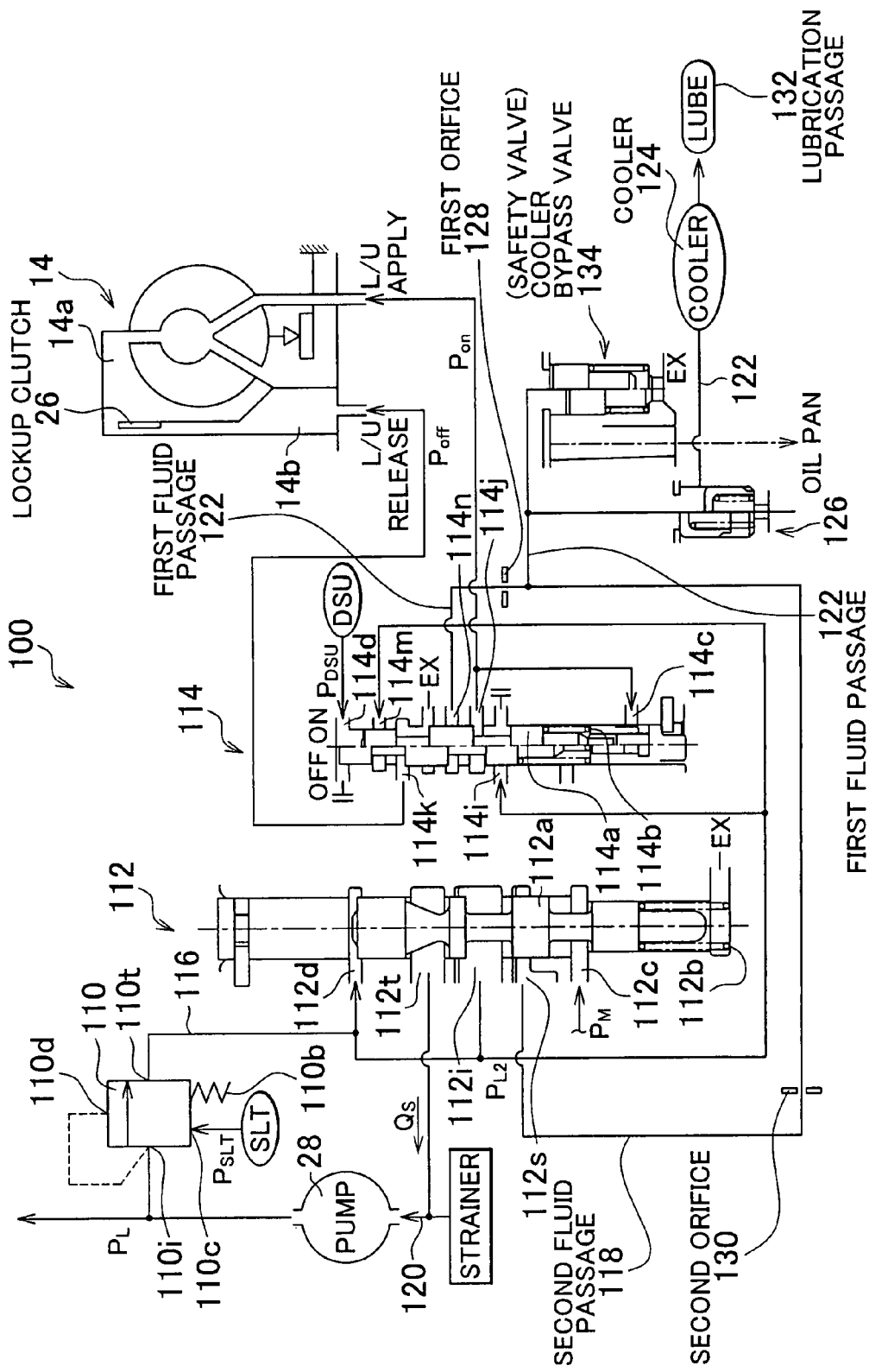

FIG. 3 is a circuit diagram of the main portions of the hydraulic pressure control circuit 100 that are related to line pressure control and apply and release control of the lockup clutch 26 and the like. Referring to FIG. 3, the hydraulic pressure control circuit 100 is provided with a relief type primary regulator valve (line pressure regulator valve) 110, a relief type secondary regulator valve (i.e., a second line pressure regulator valve) 112, and the lockup control valve 114, and the like. The relief type primary regulator valve 110 regulates the hydraulic fluid discharged from the mechanical oil pump 28, which is driven by the engine 12, to a line pressure $P_L$ according to, for example, the engine load or the like based on a control pressure $P_{SLT}$ which is the output hydraulic pressure of the linear solenoid valve SLT. The relief type secondary regulator valve 112 regulates the hydraulic fluid discharged from the primary regulator valve 110 to a second line pressure $P_{L2}$ based on the control pressure $P_{SLT}$, for example, to regulate the line pressure $P_L$ according to the primary regulator valve 110. The lockup control valve 114 switches the lockup clutch 26 between an applied state and a released state based on the control pressure $P_{DSU}$ which is the output hydraulic pressure of the solenoid valve DSU. Although not shown, other valves are also provided. Some of these valves include a squeezing force control valve, a modulator valve, an upshift speed ratio control valve and a downshift speed ratio control valve, a thrust ratio control valve, and a manual valve. The squeezing force control valve regulates the belt tension based on the control pressure which is the output hydraulic pressure of the linear solenoid valve so that the transmission belt 48 will not slip. The modulator valve regulates a constant modulator pressure $P_M$ which serves as the base pressure of the linear solenoid valve SLT and the linear solenoid value. The upshift speed ratio control valve and the downshift speed ratio control valve control the amount of hydraulic fluid flowing into the input side hydraulic cylinder 42c based on the control pressure which is the output hydraulic pressure of the solenoid valve and the control pressure which is the output hydraulic pressure of the solenoid valve so that the speed ratio γ changes smoothly, i.e., in a continuous fashion. The thrust ratio control valve applies a thrust ratio control pressure as a predetermined hydraulic pressure to the input side hydraulic cylinder 42c so as to make the ratio between the shift pressure and the belt tension Pout a predetermined relationship (i.e., ratio) when hydraulic fluid is neither being supplied nor discharged by the upshift speed ratio control valve and the downshift speed ratio control valve. The manual valve mechanically switches the fluid path according to an operation of the shift lever 74 so as to apply or release the forward clutch C1 and the reverse brake B1.

The primary regulator valve 110 includes a spool valve body, not shown, a spring 110b, a fluid chamber 110c, and another fluid chamber 110d. The spool valve body opens and closes an inlet port 110i and discharges some of the hydraulic fluid that was discharged from the oil pump 28, to a second line fluid passage 116 from an outlet port 110t as excess hydraulic fluid. The spring 110b serves as urging means for urging the spool valve body toward a position that closes the valve. The fluid chamber 110c receives the control pressure $P_{SLT}$ to apply thrust to the spool valve body in the direction that closes the valve. The fluid chamber 110d receives hydraulic fluid discharged from the oil pump 28 to apply thrust to the spool valve body in a direction that opens the valve.

In the primary regulator valve 110 having this kind of structure, if the urging force of the spring 110b is designated $F_S$, the pressure receiving area of the control pressure $P_{SLT}$ in the fluid chamber 110c is designated a, and the pressure receiving area of the line pressure $P_L$ in the fluid chamber 110d is designated b, then equilibrium is reached with Equation (1). Accordingly, the line pressure $P_L$ is adjusted based on the control pressure $P_{SLT}$ as shown by Equation (2).

$$P_L \times b = P_{SLT} \times a + F_S \tag{1}$$

$$P_L = P_{SLT} \times (a/b) + F_S/b \tag{2}$$

The secondary regulator valve 112 includes a spool valve body 112a, a spring 112b, a fluid chamber 112c, and another fluid chamber 112d. The spool valve body 112 opens and closes an inlet port 112i and discharges some of the hydraulic fluid that was discharged from the outlet port 110t of the primary regulator valve 110 to the second line fluid passage 116, from an outlet port 112s to the second fluid passage 118, and discharges the rest as excess fluid from the outlet port 112t to the intake fluid passage 120 upstream of the oil pump 28. The spring 112b serves as urging means for urging the spool valve body 112a in a direction that closes the valve. The fluid chamber 112c receives the modulator pressure $P_M$ to apply thrust to the spool valve body 112a in the direction that closes the valve. The fluid chamber 112d receives hydraulic fluid that was discharged to the second line fluid passage 116 to apply thrust to the spool valve body 112a in the direction that opens the valve. Incidentally, this secondary regulator valve 112 is structured so that the excess fluid is discharged to the second fluid passage 118 at an earlier timing than the excess fluid is discharged to the intake fluid passage 120.

In the secondary regulator valve 112 having this kind of structure, if the urging force of the spring 112b is designated $F_S$, the pressure receiving area of the modulator pressure $P_M$ in the fluid chamber 112c is designated a, and the pressure receiving area of the second line pressure $P_{L2}$ in the fluid chamber 112d is designated b, then equilibrium is reached with Equation (3). Accordingly, the second line pressure $P_{L2}$ is adjusted based on the modulator pressure $P_M$ as shown by Equation (4).

$$P_{L2} \times b = P_M \times a + F_S \tag{3}$$

$$P_{L2} = P_M \times (a/b) + F_S/b \tag{4}$$

The lockup control valve 114 includes a spool valve body 114a, a spring 114b, a feedback fluid chamber 114c, and a fluid chamber 114d. The spool valve body 114a is provided so as to be able to slide in the axial direction, which enables it to be positioned in an ON position or an OFF position. The spring 114b serves as urging means that urges the spool valve body 114a toward the OFF position. The feedback fluid chamber 114c receives a lockup apply hydraulic pressure Pon to apply thrust to the spool valve body 114a in the direction of the OFF position. The fluid chamber 114d receives the control pressure $P_{DSU}$ to apply thrust to the spool valve body 114a in the direction of the ON position. The ON position of the spool valve body 114a is a position which enables hydraulic fluid with the second line pressure $P_{L2}$ as the base pressure to be supplied as the lockup apply hydraulic pressure Pon from an inlet port 114i to an apply side fluid chamber 14a via an inlet/outlet port 114j. The ON position also opens communication between a release side fluid chamber 14b and a discharge port EX via an inlet/outlet port 114k. Further, the OFF position of the spool valve body 114a is a position which enables the second line pressure $P^{L2}$ to be supplied as lockup release hydraulic pressure Poff from an inlet port 114m to the release side fluid chamber 14b via the inlet/outlet port 114k. The OFF position also opens communication between the apply side fluid chamber 14a and the first fluid passage 122 from the inlet/outlet port 114j via an outlet port 114n.

In the lockup control valve 114 having this kind of structure, when the solenoid valve DSU is turned off (de-energized) such that the control pressure $P_{DSU}$ stops being output, the spool valve body 114a is urged to the off position and held there by the urging force of the spring 114b, as shown in the left hand side of the illustration of the valve in the drawing. In this position, the second line pressure $P_{L2}$ is supplied as lockup release hydraulic pressure Poff from the inlet port 114m to the release side fluid chamber 14b via the inlet/outlet port 114k, while hydraulic fluid in the apply side fluid chamber 14a is discharged from the inlet/outlet port 114j to the first fluid passage 122 via the outlet port 114n. That is, a circulation path for the hydraulic fluid is established from the release side fluid chamber 14b to the apply side fluid chamber 14a such that the hydraulic fluid circulates from the release side fluid chamber 14b to the apply side fluid chamber 14a of the torque converter 14. As a result, the lockup clutch 26 releases (i.e., the lockup clutch becomes off).

Also, when the solenoid valve DSU is turned on (i.e., energized) such that the control pressure $P_{DSU}$ is supplied to the fluid chamber 114d, the spool valve 114a is urged to the on position by thrust corresponding to that control pressure $P_{DSU}$ against the urging force of the spring 114b, as shown in the right hand side of the illustration of the valve in the drawing. In this position, the hydraulic fluid with the second line pressure $P_{L2}$ as the base pressure is supplied as the lockup apply hydraulic pressure Pon from the inlet port 114i to the apply side fluid chamber 14a via the inlet/outlet port 114j, while hydraulic fluid in the release side fluid chamber 14b is discharged from the discharge port EX via the inlet/outlet port 114k. That is, a circulation path for the hydraulic fluid is established from the apply side fluid chamber 14a to the release side fluid chamber 14b such that the hydraulic fluid circulates from the apply side fluid chamber 14a of the torque converter 14 to the release side fluid chamber 14b of the torque converter 14. As a result, the lockup clutch 26 applies (i.e., engages). The applied state of the lockup clutch 26 includes not only a fully applied state (i.e., lockup on), but also a transitional state between the released state and the fully applied state. For example, the lockup clutch 26 is controlled to a predetermined applied transitional state by the differential pressure between the lockup apply hydraulic pressure Pon and the lockup release hydraulic pressure Poff being continuously changed, according to the relationship between the control pressure $P_{DSU}$ and the urging force of the spring 114b, depending on that control pressure $P_{DSU}$, as the electronic control apparatus 50 continuously changes the exciting current of the solenoid valve DSU.

In this way, when a predetermined control pressure $P_{DSU}$ is output, the lockup clutch 26 applies and when that control pressure $P_{DSU}$ stops being output, the lockup clutch releases.

Figure 4:
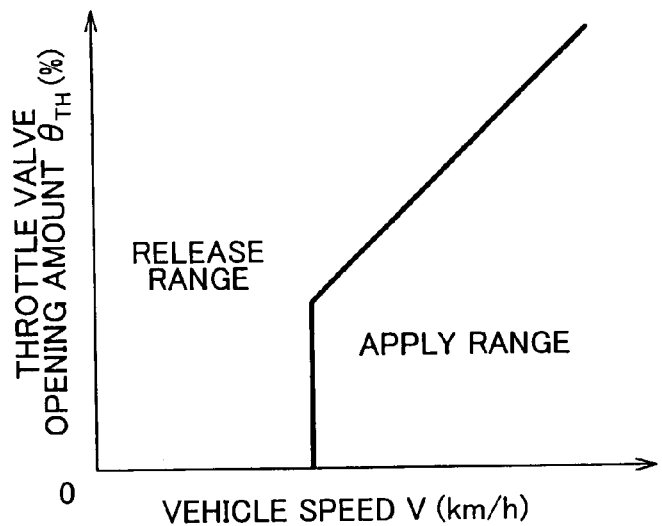
FIG. 4 is a graph illustrating a lockup range diagram used in lockup clutch control.

For example, when mainly accelerating, the electronic control apparatus 50 determines whether the lockup clutch 26 should be in a lockup range or a release range based on the actual throttle valve opening amount $\theta_{TH}$ and the vehicle speed V from a pre-stored relationship (i.e., a map or lockup range line graph) having a release range and an apply range on a two-dimensional coordinate system in which the throttle valve opening amount $\theta_{TH}$ and the vehicle speed V are variables, as shown in FIG. 4, for example. The electronic control apparatus 50 then outputs a lockup control command signal to the hydraulic pressure control circuit 100 to switch the operating state of the lockup clutch 26 so that it operates in the state of the determined range. The hydraulic pressure control circuit 100 actuates the solenoid valve DSU to switch the operating state of the lockup clutch 26 according to the lockup control command signal.

Here, in the hydraulic pressure control circuit 100 of this example embodiment shown in FIG. 3, a cooler 124 for cooling the hydraulic fluid that was heated by agitation from the torque converter 14 is connected to the downstream side of the first fluid passage 122 via a check valve 126. Incidentally, this check valve 126 may be provided only if necessary.

Also, a first orifice 128 for adjusting the hydraulic fluid that flows through the first oil passage 122 is provided in the first fluid passage 122 upstream of the cooler 124 to inhibit the amount of hydraulic fluid circulating through the torque converter 14 from becoming excessive when the lockup clutch is released (i.e., off), as well as to ensure that a sufficient amount of hydraulic fluid is circulated to appropriately suppress heat generated by the torque converter 14.

Also, a second orifice 130 for adjusting the hydraulic fluid that flows through the second fluid passage 118 is provided in the second fluid passage 118 to inhibit (excessive) hydraulic fluid from flowing through the second fluid passage 118.

It is possible to connect a lubrication passage (lubrication system) for providing lubrication to the downstream sides of both the first fluid passage 122 and the second fluid passage 118 such that there are two lubrication passages. However, if more hydraulic fluid needs to be delivered to the cooler than lubrication oil to the lubrication passage of the second fluid passage 122, then an excess amount of lubrication oil is needed because lubrication oil must also be sent to the lubrication passage of the second fluid passage 118. Therefore, in the hydraulic pressure control circuit 100 according to this example embodiment, in order to make the lubrication passage a single passage, the downstream side of the second fluid passage 118 is connected to the first fluid passage 122 between the cooler 124 and the first orifice 128, while the lubrication path 132 is connected to the first fluid passage 122 on the downstream side of the cooler 124, such that the cooler 124 and the lubrication passage 132 are connected in series.

Also in the hydraulic pressure control circuit 100 of this example embodiment, a cooler bypass valve 134 which serves as a safety valve to protect the cooler 124 is provided in parallel with the cooler 124 on the downstream side of the first fluid passage 122.

When the lockup clutch 26 is released (i.e., off), this cooler bypass valve 134 discharges hydraulic fluid directly into the oil pan so that the amount of hydraulic fluid that flows into the cooler 124 will not become excessive. At this time, the opening pressure $P_0$ of the cooler bypass valve 134 is set so that the minimum amount of hydraulic fluid necessary is discharged directly into the oil pan, e.g., so that as much hydraulic fluid as possible, within a range in which the cooler 124 is protected, flows into the cooler 124.

Also, when the lockup clutch 26 is applied, only hydraulic fluid from the second fluid passage 118 flows into the cooler 124 so the cooler bypass valve 134 does not open, which prevents hydraulic fluid from being needlessly discharged from the cooler bypass valve 134. That is, the opening pressure $P_0$ of the cooler bypass valve 134 is set to a value that is greater than a hydraulic pressure P1 between the second orifice 130 and the cooler 124 when the lockup clutch 26 is applied so that the cooler bypass valve 134 will not open when the lockup clutch 26 is applied.

Figure 5:
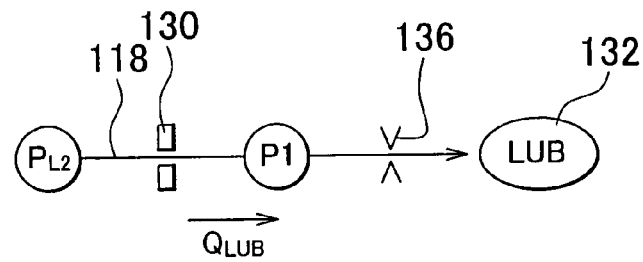
FIG. 5 is a view showing a frame format of the flowrate of lubrication flowing from a second fluid passage to a lubrication passage, using the flowrate through a second orifice, when the lockup clutch is applied.

FIG. 5 is a view showing a frame format of the amount of lubrication $Q_{LUB}$ flowing from the second fluid passage 118 to the lubrication passage 132, using the flowrate through the second orifice 130, when the lockup clutch 26 is applied.

In FIG. 5, if the hydraulic pressure before the second orifice 130 is designated $P_{L2}$ (i.e., the second line pressure), the hydraulic pressure after the second orifice 130 is designated P1, the flowrate coefficient obtained through testing beforehand is designated C, the sectional area of the second orifice 130 is designated $S_A$, the passage area (sectional area) of an equivalent orifice 136 after the cooler 124 until the lubrication passage 132 is designated $S_B$, and the density of the hydraulic fluid is designated ρ, then the relationship between the hydraulic pressure before and after the second orifice 130 and the lubrication flowrate $Q_{LUB}$ which is substantially equivalent to the flowrate through the second orifice 130 can be expressed as shown by Equations (5) and (6) in the drawing.

If the hydraulic pressure P1 is determined based on the necessary lubrication flowrate $Q_{LUB}$ from Equation (6) in FIG. 5 and that hydraulic pressure P1 is less than the opening pressure $P_0$, then the cooler bypass valve 134 will not open. That is, the second orifice 130 is restricted to the extent where the necessary lubrication flowrate $Q_{LUB}$ can be ensured without opening the cooler bypass valve 134 when the lockup clutch 26 is applied, from Equation (5).

In the hydraulic pressure control circuit 100 according to this example embodiment, a flowrate $Q_S$ of excess hydraulic fluid that is discharged from the outlet port 112t to the intake fluid passage 120 is a flowrate obtained by subtracting the necessary flowrate (=the circulation flowrate of the torque converter 14+the lubrication flowrate+the cooler flowrate+the flowrate discharged from the cooler bypass valve 134) and the amount of leakage (i.e., the consumed flowrate) of each part from the flowrate of the hydraulic fluid discharged to the second line fluid passage 116. Therefore, the flowrate $Q_S$ of excess hydraulic fluid increases due to the structure of the hydraulic pressure control circuit 100, as described above.

According to this example embodiment, the first orifice 128 is provided in the first fluid passage 122 upstream of the cooler 124 and the second orifice 130 is provided in the second fluid passage 118. Therefore, the amounts of hydraulic fluid that flow to the first fluid passage 122 and the second fluid passage 118 are regulated by the first orifice 128 and the second orifice 130, respectively, so as not to become excessive. Also, the downstream side of the second fluid passage 118 is connected to the first fluid passage 122 between the first orifice 128 and the cooler 124, while the lubrication passage 132 is connected to the first fluid passage 122 downstream of the cooler 124. Therefore, the hydraulic fluid that flows through the second fluid passage 118 also flows through the lubrication passage 132 which is in the same system as the cooler 124, while the cooler 124 and the lubrication passage 132 are arranged in series. Thus, the cooler flowrate and the lubrication flowrate are equal. As a result, the amount of hydraulic fluid that flows out from the secondary regulator valve 112 to the upstream side of the oil pump 28 can be increased.

Moreover, according to this example embodiment, the cooler bypass valve 134 is provided in parallel with the cooler 124 on the downstream side of the first fluid passage 122. The opening pressure $P_0$ of the cooler bypass valve 134 is set so that the cooler bypass valve 134 will not open when the lockup clutch 26 is applied. Therefore, the amount of hydraulic fluid that flows out from the cooler bypass valve 134 can be suppressed so that more hydraulic fluid flows out from the secondary regulator valve 112 to the upstream side of the oil pump 28.

While example embodiments of the invention have been described in detail with reference to the drawings, the invention is not limited to these exemplary embodiments or constructions.

For example, in the foregoing example embodiment, the second orifice 130 is restricted so that the hydraulic pressure P1 becomes less than the opening pressure $P_0$ so the cooler bypass valve 134 will not open when the lockup clutch 26 is applied. Alternatively, however, the opening pressure $P_0$ of the cooler bypass valve 134 may also be set higher. Also, as is evident from Equation (5) in FIG. 5, the second line pressure $P_{L2}$ may also be reduced. However, the second line pressure $P_{L2}$ must be set so that the torque capacity of the lockup clutch 26 is satisfied. Therefore, the second line pressure $P_{L2}$ may be set within a range that satisfies this torque capacity or may be set lower if there is no such restriction, i.e., if it is not necessary to satisfy the torque capacity.

Also in the foregoing example embodiment, excess hydraulic fluid is discharged to the upstream side of the oil pump 28 from the secondary regulator valve 112 that regulates excess hydraulic fluid from the primary regulator valve 110. The invention, however, is not limited to this structure. For example, the invention may also be applied even if two pressure regulator valves are not provided and excess hydraulic fluid is discharged to the upstream side of the oil pump 28 from a pressure regulator valve that directly regulates the hydraulic fluid discharged from the oil pump 28. In this case, the hydraulic fluid that is discharged from the oil pump 28 and directly pressure regulated can be circulated through the torque converter 14 and the like.

Also in the foregoing example embodiment, a belt type continuously variable transmission is used as the transmission that makes up the power transmitting device. The invention is not limited to this, however. That is, another transmission such as a well known toroidal type continuously variable transmission or a planetary gear type automatic transmission may also be used. That is, the type of transmission is not limited as long as a torque converter 14 having a lockup clutch 26 is provided in the power transmission path.

Also in the foregoing example embodiment, the torque converter 14 provided with the lockup clutch 26 is used as the fluid power transmitting device. However, instead of this torque converter 14, another fluid power transmitting device such as a fluid coupling that does not multiply torque may also be used.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

What is claimed is:

1. A hydraulic pressure control apparatus of a vehicular power transmitting device, comprising:
    a fluid power transmitting device through which hydraulic fluid discharged from an oil pump is circulated after being pressure regulated by a relief type pressure regulator valve, the fluid power transmitting device including a lockup clutch fluidically controlled by the hydraulic pressure control apparatus,
    wherein circulation paths of the hydraulic fluid are switched by a position of a single lockup control valve to control whether the lockup clutch is applied or released, the lockup control valve located between the lockup clutch and the relief type pressure regulator valve, such that,
    when the lockup clutch is released, hydraulic fluid flows out from the lockup control valve to a first fluid passage, to which a cooler is connected on a downstream side of the first fluid passage, some excess hydraulic fluid that flows out from the pressure regulator valve flows to a second fluid passage, and, simultaneously, the rest of the excess hydraulic fluid that flows out from the pressure regulator valve flows to an upstream side of the oil pump,
    the hydraulic pressure control apparatus further comprising:
    a first orifice provided in the first fluid passage upstream of the cooler;
    a second orifice provided in the second passage; and
    a lubrication passage connected to the first fluid passage downstream of the cooler,
    wherein a downstream side of the second fluid passage is connected to the first fluid passage between the first orifice and the cooler.

2. The hydraulic pressure control apparatus of a vehicular power transmitting device according to claim 1, further comprising:
    a safety valve provided in parallel with the cooler on the downstream side of the first fluid passage,
    wherein an opening pressure of the safety valve is set such that the safety valve will not open when the lockup clutch is applied.

* * * * *